(12) United States Patent
Larson et al.

(10) Patent No.: US 8,162,213 B2
(45) Date of Patent: Apr. 24, 2012

(54) ARTICLE IDENTIFICATION SYSTEM WITH FARADAY SCREENS

(75) Inventors: David F. Larson, Edina, MN (US);
Ryan R. Windy, Saint Louis Park, MN (US); Andrew J. Thompson, Lakeville, MN (US); Dean Frew, McKinney, TX (US); Jeremy Duddlesten, Carrollton, TX (US); Chad Ward, Lakeland, FL (US); Richard Svalesen, Mesquite, TX (US); David Grandfield, Frisco, TX (US); Solomon Dasary, Dallas, TX (US); Eric McPherson, Landisville, PA (US)

(73) Assignee: G&K Services, Inc., Minnetonka, MN (US)

( * ) Notice: Subject to any disclaimer, the term of this patent is extended or adjusted under 35 U.S.C. 154(b) by 420 days.

(21) Appl. No.: 12/180,137

(22) Filed: Jul. 25, 2008

(65) Prior Publication Data

US 2010/0019035 A1    Jan. 28, 2010

(51) Int. Cl.
*G06F 19/00* (2011.01)
(52) U.S. Cl. ............................................. 235/385
(58) Field of Classification Search ............. 235/385
See application file for complete search history.

(56) References Cited

U.S. PATENT DOCUMENTS

| | | | |
|---|---|---|---|
| RE33,054 E | 9/1989 | Markham | |
| 5,594,384 A | 1/1997 | Carroll et al. | |
| 5,785,181 A | 7/1998 | Quartararo, Jr. | |
| 6,307,517 B1 | 10/2001 | Lee | |
| 6,377,176 B1 | 4/2002 | Lee | |
| 6,693,539 B2 | 2/2004 | Bowers et al. | |
| 6,853,087 B2 | 2/2005 | Neuhaus et al. | |
| 6,874,639 B2 | 4/2005 | Lawandy | |
| 7,088,248 B2 | 8/2006 | Forster | |
| 7,118,036 B1 | 10/2006 | Couch et al. | |
| 7,321,305 B2 | 1/2008 | Gollu | |
| 2002/0014964 A1 | 2/2002 | Okamura | |
| 2005/0183990 A1 | 8/2005 | Corbett, Jr. | |
| 2005/0246094 A1 | 11/2005 | Moscatiello | |
| 2005/0246248 A1* | 11/2005 | Vesuna | 705/28 |
| 2006/0012366 A1* | 1/2006 | Feldman et al. | 324/310 |
| 2006/0022827 A1* | 2/2006 | Higham | 340/572.1 |
| 2006/0163350 A1 | 7/2006 | Melton et al. | |
| 2006/0212141 A1 | 9/2006 | Abraham et al. | |
| 2006/0212164 A1 | 9/2006 | Abraham et al. | |
| 2007/0229284 A1 | 10/2007 | Svalesen et al. | |
| 2007/0261997 A1* | 11/2007 | Cassady et al. | 209/3.3 |
| 2008/0007410 A1* | 1/2008 | Rosenbaum et al. | 340/572.1 |
| 2008/0024306 A1 | 1/2008 | Bomber et al. | |
| 2008/0173713 A1* | 7/2008 | Higham | 235/385 |
| 2008/0272195 A1* | 11/2008 | Brod et al. | 235/438 |

OTHER PUBLICATIONS

"Technical Report:860MHz=930MHz Class I Radio Frequency Identification Tag Radio Frequency & Logical Communication Interface Specification Candidate Recommendation," Version 1.0.1, Nov. 14, 2002, 18pgs., Auto-ID Center, Massachusetts Institute of Technology, Cambridge, MA.

"White Paper: EPCglobal Class 1 Gen 2 RFID Specification," 2005 (approved Dec. 2004), 7 pgs., http://www.alientechnology.com/docs/AT_wp_EPCglobal_WEB.pdf, Alien Technology Corporation, Morgan Hill, CA.

* cited by examiner

*Primary Examiner* — Daniel Hess
*Assistant Examiner* — David Tardif
(74) *Attorney, Agent, or Firm* — Brooks, Cameron & Huebsch, PLLC

(57) ABSTRACT

The present disclosure includes methods and systems for identifying articles. One method embodiment includes positioning a number of movable Faraday screens in particular locations relative to a number of different stages in a laundering process, and moving a mobile electronic identification device (EID) reader past the locations.

21 Claims, 9 Drawing Sheets

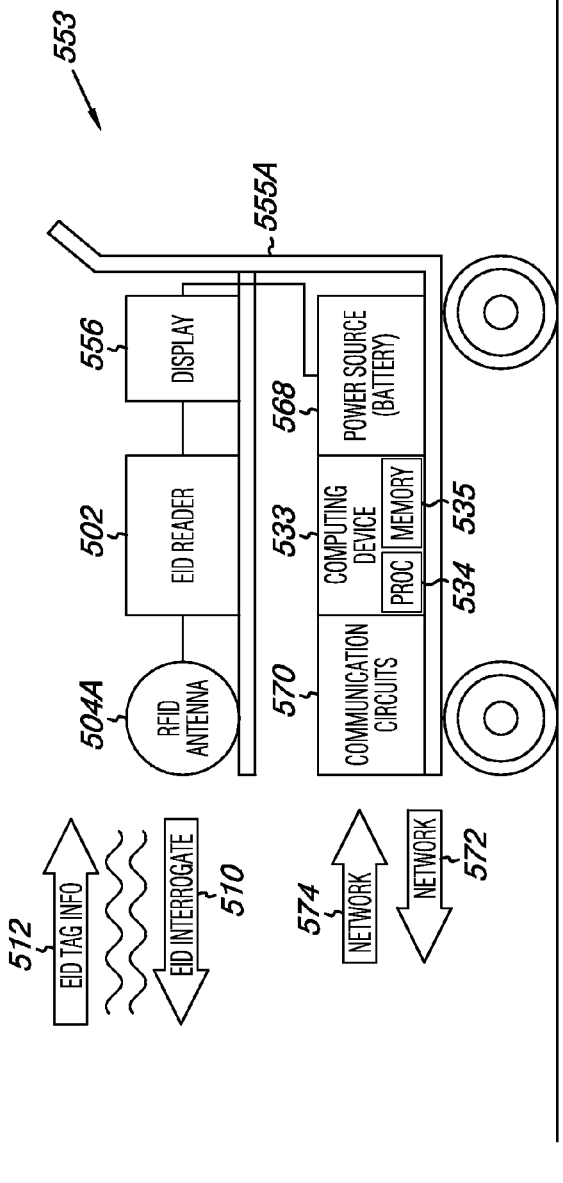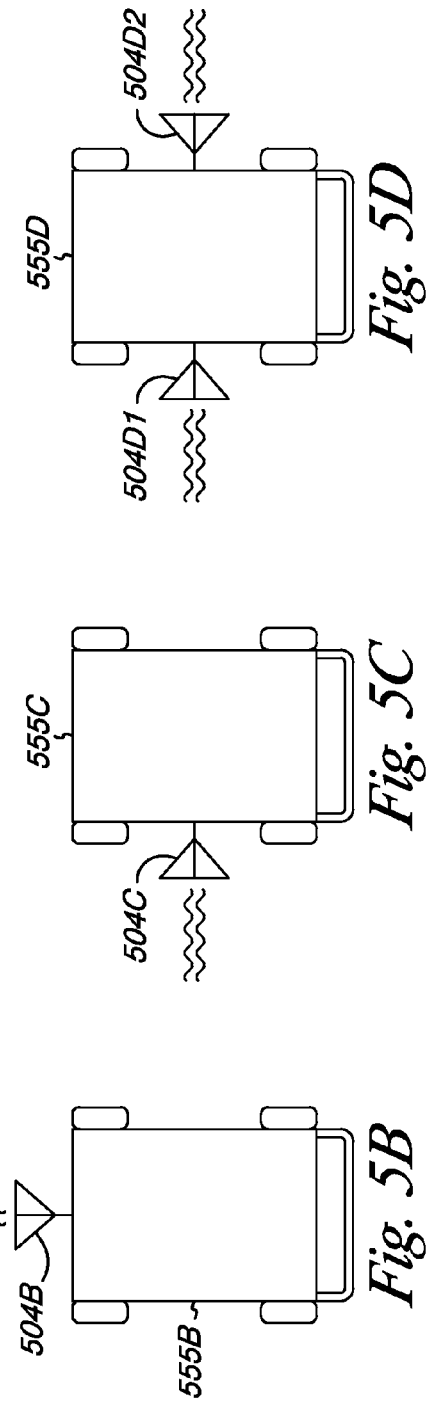

ARTICLE IDENTIFICATION SYSTEM WITH FARADAY SCREENS

TECHNICAL FIELD

The invention relates to item tracking systems. More particularly, in one or more embodiments the invention relates to systems and methods for selectively reading a group of articles associated with electronic identification devices.

BACKGROUND

Certain industrial and commercial activities involve a large number of articles and/or items that must be separated, identified, counted, and sorted, e.g., into groups, for use and/or processing. Industrial laundry articles, such as garments and other textiles, may be collected or handled in random bundles when they are used and/or soiled. Bins or other containers may be used to collect the articles from a number of users, which subsequently will require sorting, for instance to separate the articles for various cleaning processes, e.g., separating dark and light colors prior to washing. Delivery trucks may collect articles from a number of entities and/or locations.

In the textile service industry soiled garments or other textile items may be returned in large unsorted groups, requiring sorting for cleaning, processing, and return to the customer in an organized fashion. Sorting and other inventory control measures may be accomplished using workers who sequentially sort the many items at one or more stages of cleaning/processing, picking single items manually and identifying the items visually. This process may be slow and/or expensive due to the reliance on manual labor, and because human error may affect matching and sorting the articles and/or items, e.g., garments.

Bundles are most often managed in bulk because dealing with the articles on an individual basis may be labor intensive. After arriving at a commercial laundering facility, laundry may be separated in types dependent on which articles can be processed together. Sorting articles based upon different processes, delivery routes, and/or accounts may also occur.

Several identification and sorting systems are available that may provide some improvement over manual methods. In some instances, items may be marked with human readable text, bar codes and/or other markings that can be read with optical readers in order to identify garments that belong to a particular group. However, use of bar codes and other optically-based markings on goods that are flexible and assume a number of orientations that may distort and/or obscure optical-based identifying markings and therefore may easily distort and/or shield such markings. As a result, errors may occur that negatively affect inventory determination and/or record keeping. Furthermore, textile items may range in size from very small to very large. Additionally, articles may undergo severe wear, usage, and/or processing cycles, e.g., cleaning, that may damage identification tags.

Bar codes generally require a line-of-sight path to an optical reader, within a distance that may be proportional to the size of the bar code marking, and at a specific orientation with respect to the optical reader, which may be difficult constraints to satisfy under large scale laundry servicing conditions. Identification systems that rely on reading optical marking, e.g., bar codes, may not be well suited for use with particular textile articles, e.g., flat goods such as napkins, tablecloths, towels and bed linen items. Bar codes, and other optically-based markings, may be susceptible to degradation through soiling, wear, and cleaning, etc. Due to the precise spatial information associated with reading a bar code, e.g., bar width, orientation, spacing, etc., warping of the bar code that might occur on a textile, may result in increased rates of reading error, e.g., omissions and/or inaccuracies, and thus negatively impact inventory management.

BRIEF DESCRIPTION OF THE DRAWINGS

FIG. 5A is a side view of a mobile EID reader, in accordance with one or more embodiments of the present disclosure.

FIG. 5B is a top view of a mobile EID reader having an antenna, in accordance with one or more embodiments of the present disclosure.

FIG. 5C is a top view of a mobile EID reader having a single side-aimed RFID antenna, in accordance with one or more embodiments of the present disclosure.

FIG. 5D is a top view of a mobile EID reader having dual side-aimed RFID antennas, in accordance with one or more embodiments of the present disclosure.

DETAILED DESCRIPTION

Figure 1:
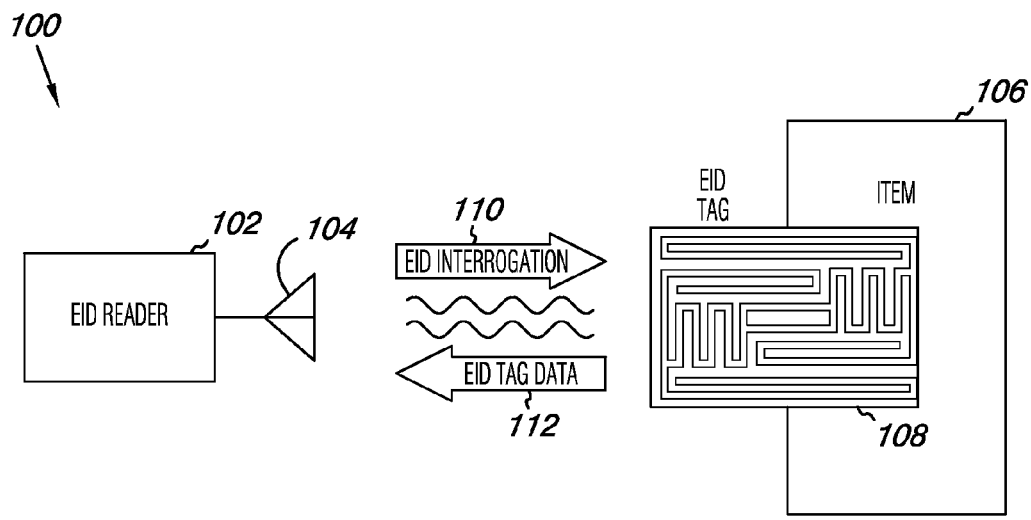
FIG. 1 is a block diagram of a wireless electronic identification device (EID) communication system, in accordance with one or more embodiments of the present disclosure.

The present disclosure includes methods and systems for identifying articles. One method embodiment includes positioning a number of movable Faraday screens in particular locations relative to a number of different stages in a laundering process, and moving a mobile electronic identification device (EID) reader past the locations.

In the present disclosure, reference is made to accompanying drawings that form a part hereof, and in which is shown by way of illustration how one or more embodiments of the disclosure may be practiced. These embodiments are described in sufficient detail to enable those of ordinary skill in the art to practice the embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. It should also be apparent that the scaling on the figures does not represent precise dimensions of the various elements illustrated therein.

While the invention of the present disclosure is discussed and illustrated herein using an example of articles, e.g., garments, door sleeves, being periodically used and subsequently processed by a commercial laundry facility, embodiments of the present invention are not so limited. Aspects of the present invention may be applied to other processes and uses which may benefit from article identification and inventorying methodologies and systems set forth herein.

Businesses and organizations provide articles such as garments and other textile items to their workers, members, and/or customers. Garments may include uniforms to identify a person as an employee of the business, or member of the organization, to communicating a brand image of the business or organization, as a benefit of employment or membership, and/or to ensure cleanliness of attire in an efficient, standardized, and convenient manner, e.g., as a means of assuring textile items are processed, e.g., cleaned and/or sanitized, according to applicable requirements. Certain businesses and organizations may also provide specialized garments, such as clean room attire, protective garments, or garments cleaned to certain standards, or by specific processing steps.

In food preparation and processing environments, an employer or regulating authority for example, may insist upon specific guidelines for use, cleansing or sanitizing of a garment. In some cases, regulations and laws may set certain minimum guidelines as well. Extraordinary cleanliness requirements, such as for production of microelectronics, or in health care facilities, may require specialized garments in order to prevent contaminants from being introduced into a clean room setting, or into a surgical area for example.

Uniforms, garments, textiles, linens, and other articles are often obtained by a business or organization from a commercial garment provider, which may also subsequently provide laundering, optional sanitizing, alterations, repair, replacement, and other article processing services. The garment provider may initially procure and deliver the garments and other articles to the customer for use. Arrangements may be made with a commercial launderer (which may or may not be the garment provider) to pick-up used or soiled garments, processes the garments, e.g., clean, sanitize, repair, replace, etc., and return the garments to the customer, e.g., to the customer's location(s).

Garment providers, and/or commercial launderers, may launder and/or process items in addition to garments such as clothing and uniforms, including but not limited to shop towels, floor mats, linens, and other textiles, as well as other items that require laundering or processing. One skilled in the art will understand that the term "article," as used herein, is not intended to be limiting and should be understood to include garments, textiles, linens, clothing such as uniforms, as well as towels, mats, rags, linens, protective gear, and other items that can be laundered or otherwise processed in the garment provider's or commercial launderer's facilities for the customer.

A system for delivery of non-personalized garments and other items would typically begin with reception of an initial order from a customer. The order could include various portions of a uniform or of complete sets of garments to be used together by an employee. The garments may be those that are worn over a worker's own clothing or that are donned at the customer's facility in place of a worker's own clothing.

The garment provider assembles the various parts of the order for delivery to the customer either from new products obtained from a third party supplier or from existing inventory of new products. In addition, in some circumstances, customers may be given the option to fill orders from the garment provider's inventory of previously used products. Previously used products are often supplied at a discount relative to new products.

According to one or more embodiments of the present invention, some or all of the individual articles, e.g., garments, may be tagged with an electronic identification device (EID) as described herein, and associated together in a computerized inventory tracking system. Tagged garments may be individually scanned to ensure fulfillment of the order and optionally to associate the particular garment as a part of a particular order. Thereafter, a garment may be brought into a staging area and passively scanned by a reader.

Garments or other items that are not individually tagged, e.g. shop towels or small, low value garments, may be aggregated together such as in a bag, box, tote, bin, container, vehicle, package, or other area that is tagged with an EID in order to ensure fulfillment of the order. Where individually tagged garments are placed in larger containers, or areas, for delivery, the containers may be identified by their own attached EID, and EIDs of individual garments associated with the container at the time they are placed in the larger container.

Garments that are personalized to the user, e.g., a customer, a customer's employee, etc., may be collected as a set, or group, and have various physically identifying markers, e.g. patches, ribbons, labels, and the like, applied to the garment. The EIDs that are part of the group specific to a user may also be programmed, e.g., in a computerized inventory tracking system, to identify the garment, or group of garments, as being associated with the user.

An order may be assembled and loaded onto a vehicle for delivery to the customer in one or more groups. As each part is loaded it may be scanned using a mobile or static reader to obtain information from the EIDs present in that part of the order. The information from the EIDs may be assembled in the mobile reader, or at a information point, e.g., computerized inventory tracking system, and compared to the intended order, thereby identifying locations and/or status on various portions of the order. Once an order is assembled in a garment provider facility, commercial laundry, or in the delivery vehicle, or other physical location or before/after a particular processing step, items may be further scanned and a database, e.g., computerized inventory tracking system, updated. This information may be available locally, or communicated to the customer, third parties, or other interested parties.

As one skilled in the art will appreciate, the article identification system of the present disclosure may be used to track exchange of articles between vendor and customer, and help determine the last location of missing item(s), to help ascertain responsibility for the missing item(s). For example, an inventory of a group of items can assist in determining which party may have lost an item, and thus who might be responsible for its cost. Another application of the article identification system of the present disclosure is when a garment is noticed to be damaged, and in determining whether the damage arose from use in the customer's facility or during processing within the hands of the garment provider or commercial launderer. Information on the location of the garment can be made available to all interested parties allowing them to reach an agreement on the facts.

While the invention of the present disclosure is further discussed and illustrated herein using radio frequency identification (RFID) transceivers as EIDs. An RFID system as one example of a wireless communication/identification system which may be used to implement the present invention; however, embodiments of the present invention are not so limited. Aspects of the present invention may be applied to other wireless communication techniques, and encompasses other electronic identification devices and systems which may provide article identification and locating capabilities, including, but not limited to, global positioning system, etc. Embodiments of the present disclosure are not limited to wireless communication systems utilizing radio frequencies, and may be implemented using electromagnetic signals of higher, or lower, frequencies, such as light signals, audio signals, analog signals, digital signals, ultra high frequency (UHF) radio signals, and signals being modulated in amplitude, frequency, and by other techniques.

RFID generally encompasses wireless (or partially wireless) communication that allows for remote retrieval of information associated with a particular commodity, product, article, component, or other item using radio frequency communication signals. In RFID environments, each suitable item is tagged with an RFID tag that includes one or more pieces of information including, for example, a unique tag identifier. These pieces of information are requested or retrieved by an EID reader device, e.g., RFID reader. The RFID tag, e.g., EID, actively or passively transmits information when properly interrogated. RFID techniques do not suffer from the line of sight and soiling problems associated with bar codes, and other optical technologies.

FIG. 1 is a block diagram of a wireless EID, e.g., RFID, communication system, in accordance with one or more embodiments of the present disclosure. The wireless EID communication system 100 includes an EID reader 102, e.g., RFID reader, coupled to one or more antennas 104. An EID, e.g., EID tag, RFID tag, etc., 108, can be attached to, or otherwise physically associated with, an item 106, i.e., an article, to be tracked. The item may be an article such as a garment, fabric, textile, or other good. The EID reader 102 transmits EID a number of interrogation signals 110, causing the EID tag 108 to transmit EID tag data 112 which is received through the antenna 104, and processed by the EID reader 102.

EID tags may be used to mark, track and identify articles such as garments, textiles, linens, goods, and other items. EIDs tags typically include an integrated circuit (IC) that is operatively coupled to an antenna (the tag antenna). An active EID tag may also have a battery. A passive EID tag may have no battery, instead obtaining energy to power the EID tag from the signals emitted by the reader. Passive EID tags, e.g., without batteries, may be preferred for applications in which lower cost or smaller size is a dominant factor, e.g., for use on an article such as a garment. Active EID tags, e.g., with internal power supply, may be preferred for applications in which a longer read range is preferred. Passive EID tags, active EID tags, or both, may be used in conjunction with embodiments of the present invention. According to one or more embodiments, the EID tags of the present disclosure resonate in the ultra high frequency (UHF) or microwave frequency range, enabling an EID reader to interrogate, e.g., read and/or write to, the EID tags from a sufficiently range to be useful; however, embodiments of the present disclosure are not so limited and may operate using higher or lower frequency ranges.

The IC associated with an EID tag of the present disclosure typically includes a certain amount of memory, e.g., nonvolatile, flash, etc., in which a tag identifier is stored, and may store additional or other information related to the tag, the item, groups, or entity with which the tag is associated.

When an EID reader (also known as an EID interrogator, either of which may read or write information to an EID tag) transmits energy to interrogate the EID tag, the EID tag responds with EID tag data from which the EID reader can obtain the EID tag identifier and/or other stored information. The data, identifier, and/or information obtained by the EID reader may subsequently be processed and compared to entries in a database of identifiers, or to information associated with EID tags and articles to which they are attached. In this manner, information regarding a corresponding article, e.g., item, may be obtained, updated, modified, retrieved, and provided to a user, and/or written to an EID tag, even in real-time.

Figure 2:
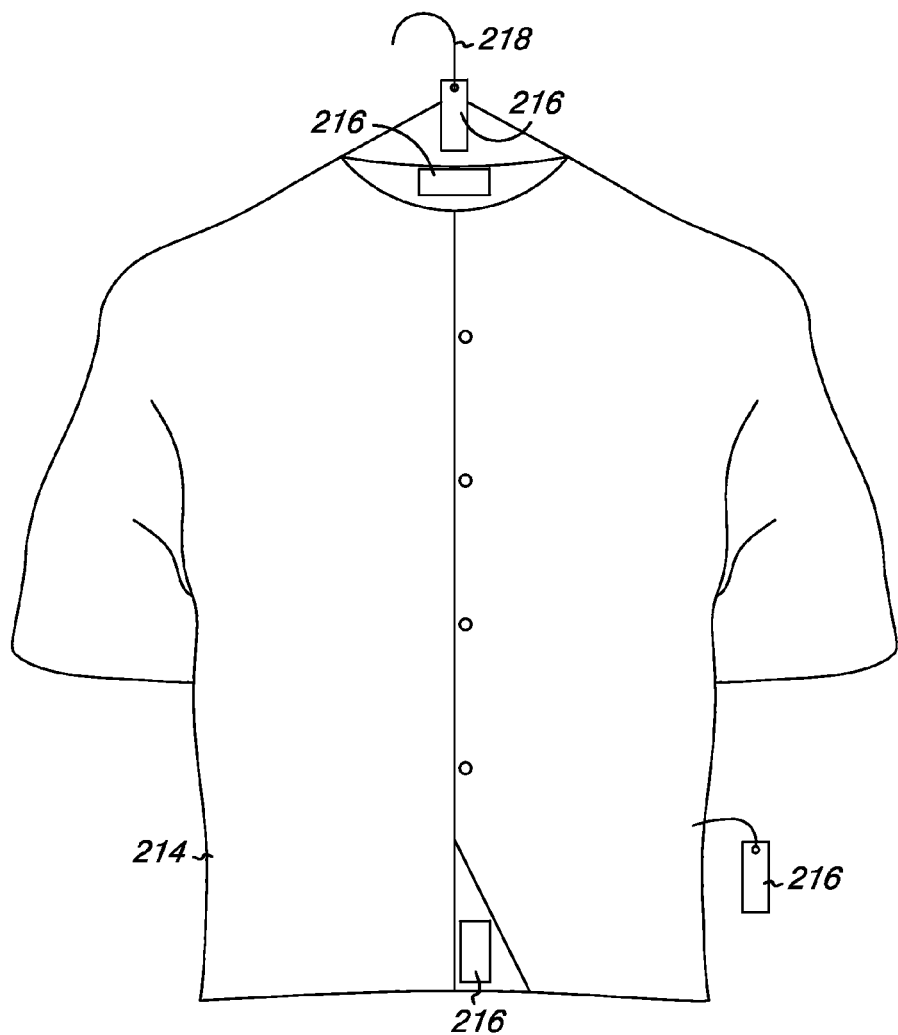
FIG. 2 is a front view of a garment including examples of EID tag placement, in accordance with one or more embodiments of the present disclosure.

FIG. 2 is a front view of a garment including ED tag(s), in accordance with one or more embodiments of the present disclosure. An ED, such as an EID tag, is small enough to be attached to an article to be tracked. In one or more embodiments, a button sized EID tag having a unique number, is attached to a garment. FIG. 2 shows several locations at which an identification tag, e.g., 216, may be attached to, or physically associated with, a garment, e.g., shirt 214. For example, an identification tag 216 may be affixed directly into the garment by being attached to the collar of shirt 214 and/or to the tail of shirt 214, by sewing or bonding the identification tag 216 to the material of the garment, for example. An EID tag may be affixed in a similar manner to other types of articles, e.g., garments, for example, by attaching to an area of the waist lining of a pair of pants, etc.

According to another implementation, an EID, e.g., 216, may be fastened to the garment as a hang tag (as shown in FIG. 2) in a manner similar to how a price tag may be fastened to a new garment, e.g., using a length of plastic filament having one end hooked through the garment and the other end hooked through the identification tag, e.g., 216. In an alternative embodiment, an EID, e.g., 216, may be fastened to, or hung from, a hanger 218 upon which the garment is hung, and/or affixed to the packaging containing the garment (not shown). One skilled in the art will appreciate the variety of articles, in addition to garments and textiles, and the numerous manners in which EIDs, such as RFID tags, may be affixed, attached, or otherwise physically associated the particular articles.

The tag, e.g., 216, allows the garment, e.g., shirt, to be properly tracked, sorted and matched to one or more groups to which it may belong during its life cycle, for example, at a commercial laundry or dry cleaners. The tag, e.g., 216, can be attached by, e.g., sewing in a hem or liner of a garment, or by gluing or otherwise a fixing the tag to the garment.

The EID tag may be applied to the garment on the first visit and the EID tag identification number is read. Information related to the garment (such as owner name, dates, reason for cleaning, etc.) may be programmed to a computing device associated with the identification number. Each time the garment is read, e.g., at various locations within a facility or at certain steps in the garment's life cycle, the identity and/or other stored information on EID tag is read, and a available to update a database. A computer inventory system, having a database of articles, e.g., garments, can be used to maintain a history record related to each garment, and associated with the identification information of the EID tag.

The electrical components of an EID, e.g., RFID tag, may be physically or mechanically isolated from the environment by providing the substrate with a top and bottom comprised of substantially flexible, high temperature resistant materials. By way of example, and not to the exclusion of other embodiments, the substrate with its electrical components may be housed in a top and bottom layers comprised of a substantially flexible polymeric material. According to one or more embodiments, the substrate is joined to top and bottom layers by means of a thermally resistant, substantially flexible silicone encapsulant on one side and with a high temperature adhesive on the other side. The encapsulant may have a temperature rating in the range of 500 degrees F. Physically isolating the tag electronic components with thermally resistant materials provides a tag which exhibits superior thermal and shock resistance. Examples of an EID tag attached to a garment are provided in U.S. Pat. No. 7,327,217, entitled "Security Methods, Systems and Articles of Manufacture" (which is commonly assigned, and herein incorporated by reference in its entirety); U.S. patent application Ser. No. 12/025,892 (U.S. Patent Publication No. 2008/0136588), entitled "Security Methods, Systems and Articles of Manufacture" (which is commonly assigned and herein incorporated by reference in its entirety); and U.S. patent application Ser. No. 11/724,587 (U.S. Patent Application Publication No. 2007/0229284), entitled "Radio Frequency Identification Tag and Method of Forming the Same."

In addition to chemical encapsulation, EIDs such as RFID tags, of the present disclosure can be physically or mechanically isolated from various environmental factors, as well. The identification devices of the present disclosure are preferably capable of functioning in a variety of environments, and must therefore be encapsulated or isolated for durability against shock, fluids, chemicals, heat, dust and dirt, and the like. Although a variety of tags are commercially available which might suffice in some environments, others will required additional rugidization so as to be isolated or protected to withstand the rigors of more harsh environments, such as high temperatures, certain chemicals, and/or processing methods.

EIDs applied to garments and other textiles, are desired to have a small footprint, be thin, e.g., in thickness ranges of about 0.020 in. to 0.040 inches, and substantially flexible. Tags capable of withstanding temperature ranges of approximately −40 degrees C. to 300 degrees C. may be used to implement the present disclosure.

EID tags used in the system of the present disclosure provide improved readability and reliability over line of sight identification indicia such as bar codes or other optically-based markers. EID tags are readable despite various orientations of the article, e.g., garment, being handled. EID tags may be constructed to withstand both shock and temperature cycles likely to be encountered in the intended environment of use, and cleaning/sanitizing processes. EID tags are reasonably priced, allowing them to be economically incorporated into, for example, individual articles, such as garments.

Presently available RFID systems operate in both low frequency (less than 100 megahertz) and high frequency (greater than 100 megahertz) modes. Unlike their low-frequency counterparts, high-frequency tags can have their data read at distances of greater than one meter, even while closely spaced together. Data can also be transmitted to, and stored in, the EID tags.

According to one or more embodiments of the present disclosure, in a low-frequency EID-based article identification system, an integrated circuit sends a signal to an oscillator, which creates an alternating current in the reader's coil. That current, in turn, generates an alternating magnetic field that serves as a power source for the tag. The field interacts with the coil in the tag, which induces a current that causes charge to flow into a capacitor, where it is trapped by the diode. As charge accumulates in the capacitor, the voltage across it also increases and activates the tag's integrated circuit, which then transmits its identifier code. High and low levels of a digital signal, corresponding to the ones and zeros encoding the identifier number, turn a transistor on and off.

Variations in the resistance of the circuit, a result of the transistor turning on and off, cause the tag to generate its own varying magnetic field, which interacts with the reader's magnetic field. In this technique, called load modulation, magnetic fluctuations cause changes in current flow from the reader to its coil in the same pattern as the ones and zeros transmitted by the tag. The variations in the current flow in the reader coil are sensed by a device that converts this pattern to a digital signal. The reader's integrated circuit then discerns the tag's identifier code.

According to one or more embodiments of the present disclosure, in a high-frequency system, an integrated circuit sends a digital signal to a transceiver, which generates a radio-frequency signal that is transmitted by a dipole antenna. The electric field of the propagating signal gives rise to a potential difference across the tag's dipole antenna, which causes current to flow into the capacitor; the resulting charge is trapped by the diode. The voltage across the capacitor turns on the tag's integrated circuit, which sends out its unique identifier code as a series of digital high- and low voltage levers, corresponding to ones and zeros. The signal moves to the transistor. The transistor gets turned on or off by the highs and lows of the digital signal, alternately causing the antenna to reflect back or absorb some of the incident radio frequency energy from the reader. The variations in the amplitude of the reflected signal, in what is called backscatter modulation, correspond to the pattern of the transistor turning on and off. The reader's transceiver detects the reflected signals and converts them to a digital signal that is relayed to the integrated circuit, where the tag's unique identifier is determined.

EID tags may be first generation, ultra high frequency (UHF) tags in certain applications, however UHF EID tags operating at 860-960 MHz (or within a subset of this, or another frequency range mandated by applicable national laws or regulations) and utilizing second (or later) generation specifications may be used to implement the present invention. Embodiments of the present disclosure are not limited to a particular evolution of EID technology, and may be implemented using EIDs of a variety of vintages having faster reading, or to allow for storage of more information relating to the identity of the garment or other item, and/or to allow for greater range of reading.

EID tags useful to implement embodiments of the present invention will typically comprise an EID chip (typically 1-2 mm in size), an antenna, a chip saddle or other connection between the chip and the antenna, and a substrate into which the chip, saddle, and antenna are fixed. The antenna may be constructed from numerous different materials, including but not limited to etched metal, conductive ink, conductive rubber or wire. The EID tags utilized in the system need not contain internal power source, e.g., passive tags, but derive power needed to activate the memory and transmission functions from the signal sent by a reader and received by the antenna connected to the EID chip.

EID tags utilized in one or more embodiments of the system(s) disclosed herein are designed to withstand the harsh processing conditions encountered in an industrial laundering process as well as other conditions found in a customer facility. Typically, EID tags by themselves are unable to withstand the harsh conditions of a laundering process. Thus, the inlay may be contained within a protective layer to create an EID tag. The protective layer will stand up to the conditions under which a garment is utilized and laundered and may have features (such as holes or structures) that allow for secure placement of the tag on a garment.

The tag may be situated on a garment or other item in a way that is innocuous to the user and at a minimum should not interfere with the user's ability to perform the tasks assigned to them. The tag can have a form and character that prevents it from causing discomfort to the garment wearer or user. Optionally, the EID tag may have additional identifying information located on an outside surface of the tag, such as a visually identifiable serial number or a barcode. Optionally, the tag can have the capability to be read together with many other tags at a large distance (i.e. 20 ft), so-called far field capabilities, or be configured to be read as a single item separate from other tags located close by, e.g., within 1 ft (near field reading).

Temporary EIDs, having RFID capability, or other information, may be used in the supply chain from the manufacturer to the garment provider. The garment provider may use the temporary tags for inventory purposes and for tracking of garments and other items received at a main receiving facility and during distribution to regional and local facilities that are in proximity to a customer.

Figure 3:
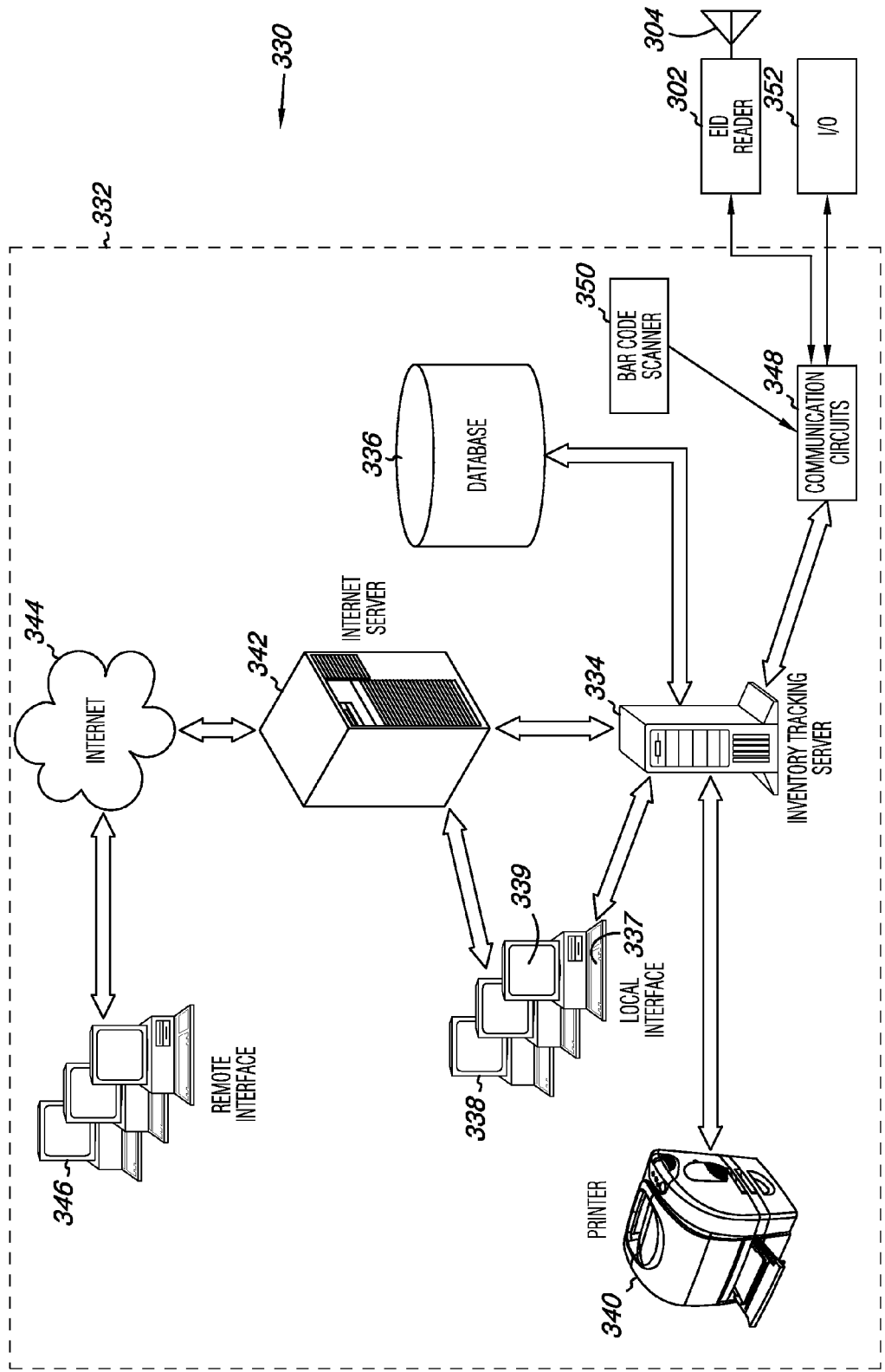
FIG. 3 is a block diagram of a computerized article identification system, in accordance with one or more embodiments of the present disclosure.

FIG. 3 is a block diagram of a computerized article identification system, in accordance with one or more embodiments of the present disclosure. One or more embodiments of the article identification system of the present disclosure may also include data processing capability that allows for highly accurate tracking of garments and other items through the use and processing cycle of such garments/items, e.g., a laundering process. The article identification system 330 includes an EID reader 302, which may employ an internal or external antenna(s) 304, and a computing system, e.g., platform, 332. Computing system 332 includes an inventory tracking server 334, and may have input/output circuits 352 for communications with other computing devices and/or systems.

Inventory tracking server 334 comprises a computing device and may be communicably connected with a number of local clients 338 and/or other network devices such as internet server 342, switches or routers, printers, docking stations, or others. For example, inventory tracking server 334 may be a blade server, a mainframe, a general-purpose personal computer (PC), a workstation, or other suitable device. Clients, e.g., local clients 338, may have input devices 337, e.g., keypad, touch screen, mouse, or other device that can accept information, and/or output devices 338, e.g., displays. One or more printers, e.g., 340, may be connected to inventory tracking server 334 (as shown), or to one or more clients, such as by a networked connection.

While FIG. 3 illustrates one inventory tracking server 334 being may be used with the invention, system 330 can be implemented using computers other than servers, such as a server pool. However, embodiments of the present disclosure are so not limited, and general purpose computer devices may be utilized as a server. As used in this document, the term "computing device" is intended to encompass a personal computer, workstation, network computer, or other suitable processing device. Inventory tracking server 334 may be adapted to execute an operating system so long as inventory tracking server 334 remains operable to process native or massaged EID data.

Inventory tracking server 334 typically is coupled to communication circuits 348 functioning as an interface for communicating with external components, such as I/O 352 for communications to other computer systems, and one or more EID readers, e.g., 302.

Inventory tracking server 334 may be connected over a network, e.g., in a client-server or other distributed environment, or through an interact server 342 to remote clients, e.g., 346. Generally, the interface comprises logic, e.g., ASIC, software, and/or hardware, in a suitable combination and operable to communicate with network 344. More specifically, the interface may comprise software supporting one or more communications protocols associated with communications network 344 or hardware operable to communicate physical signals. Inventory tracking server 334 may comprise a computing device with software and/or hardware in combination suitable to receive or retrieve EID information from EID tags via an EID tag reader, e.g., 302. Inventory tracking server 334 may be used to generate web pages or other output based on the item EID data, and communicate the output to users of one or more clients, e.g., local 338 and remote 346, via network 344. Network 344 facilities may include wireless or hard wire communication between servers 334 and 342 and/or other computing device(s).

An EID application may include hardware, software, firmware, or combination thereof operable to collect or receive EID information, e.g., from EID reader 302. For example, an EID application may receive EID information, process it according to various algorithms, and store the processed data in memory, e.g., in a database 336. The processing may include mapping the various tagged items using the EID technology, embedding information for each tagged item 150 in a webpage, summarizing collected EID data, etc.

Each client, e.g., 338 and 346, may be a computing device operable to present the user with raw or processed EID information via a graphical user interface (GUI), e.g., 339. At a high level, illustrated clients, e.g., 338 and 346, include at least a GUI, e.g., 339, and comprises an electronic computing device operable to receive, transmit, process and store appropriate data associated with system 330. It will be understood that there may be a number of clients, e.g., 338 and 346, may be communicably coupled to server 334.

Figure 4:
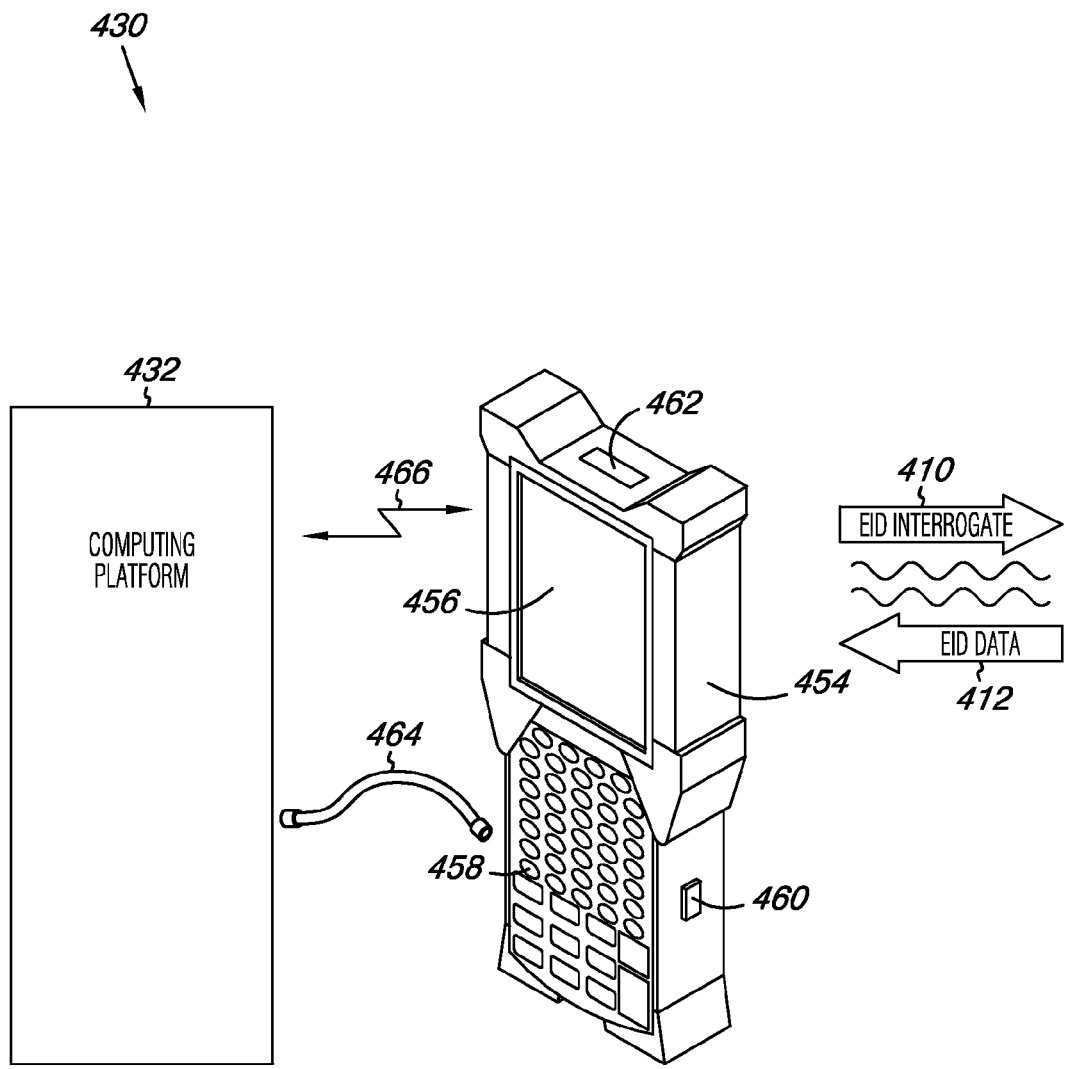
FIG. 4 is a perspective view of a portable EID reader, in accordance with one or more embodiments of the present disclosure.

FIG. 4 is a perspective view of a mobile, e.g., portable or handheld, EID reader, in accordance with one or more embodiments of the present disclosure. One or more embodiments of a computerized article identification system 430 of the present disclosure, includes a computing platform 432, e.g., computer system 332 shown in FIG. 3, and a mobile EID reader 454. One or more embodiments of an article identification system described herein utilizes EID tags, and utilizes an EID reader, e.g., RFID tag reader, capable of reading information on the EID, e.g., RFID tag. According to one or more embodiments, the EID reader 454 is also capable of writing information to the EID.

Conventional EID readers are either small handheld devices that operate in a limited EID space, or are stationary devices located at certain process points, for example, junctions, doors, gates, and other non-mobile or fixed sites. The handheld EID reader 454 illustrated in FIG. 4 generally requires the operator to be within several feet of an EID tag to perform an accurate query, depending on the power of the handheld EID reader. Some stationary or fixed mount devices offer relatively greater distance communications, but are also usually larger than the handheld devices.

EID reader 454 includes an output portion 456, e.g., display, and an input portion 458, e.g., keypad. It has an internal antenna (not shown) for transmitting EID communication signals, e.g., 410, and receiving communication signals transmitted from an ED 412, e.g., EID tag data.

The EID reader 454 includes a processor and may be manually docked or interfaced with a computing platform 432, such that the collected EID information can be processed, e.g., downloaded and/or uploaded from a database. The EID reader 454 may be communicatively coupled to the computing platform 432, through a hard wire connection 464, or through a wireless connection 466. The EID reader 454 may optionally be equipped with an optical reading device 462, for example to enable reading bar codes, and may include other controls 460 applicable to remotely reading EIDs. EID reader 454 is thus capable of interrogating an EID both within, and outside of, line-of-sight. EID reader 454 is capable of functions other than the identifying function of an EID, such as data entry and programming, among others.

The EID reader 454 transmits EID interrogation signal(s) 410, causing an EID to transmit EID data 412, which is received through an internal antenna in the EID reader, and processed by the EID reader 454. An example of a handheld EID reader is provided in copending, commonly assigned U.S. patent Ser. No. 11/759,133, entitled, "Computerized Processing Using Handheld Apparatus", filed Jun. 6, 2007, which is incorporated herein by reference.

Garments and other items may be tracked by use of handheld EID readers that can report some or all of the information on an EID to a information collection point in real time or when the unit is docked (through a hardwired or wireless connection). Static ports may also be used in a facility to record and/or report the movement of garments from one area of the facility to another. These mobile readers may be manually moved about a given space by workers to interrogate EID tags in various regions of the facility and provide location and other information to an information collection point.

FIG. 5A is a side view of a mobile EID reader, in accordance with one or more embodiments of the present disclosure. Mobile EID reader 553 is fabricated on a cart 555A. Cart 555A is a device operable to physically travel or relocate among or around a plurality of EID tagged items such that a fill-size EID antenna 504A may be considered relatively portable. For example, cart 555A may be a shopping cart, a golf cart, a dolly, a flatbed, a forklift, a robot, an airport shuttle cart, an airport luggage cart, or other suitable vehicle or mobile mechanism of appropriate size to accommodate at least one EID antenna 504A. The mobile reader cart 555A may be manually motivated throughout an environment, such as a pushcart that is pushed, or may be a vehicle having its own mobility system, such as a forklift, or an autonomous robotic device.

According to one or more embodiments, cart 555A may be a hand-pushed device or an electronic device operable to automatically relocate according to present commands or algorithms or a dynamically determined path. Cart 555A includes at least one EID antenna 504A, an EID reader 502, e.g., EID tag reader, and an onboard power source 568. Power source 568 may also be a suitable battery or fuel source operable to (at least partially) power cart 555A and power EID antenna 504A and EID tag reader 502. The mobile EID reader includes a processor, a memory, and computer executable instructions stored in the memory and executed by the processor to obtain an EID identifier. The EID identifier is, for example, associated with an article in a laundering process.

Cart 555A is shown in FIG. 5A as also including an onboard, e.g., local, computing device 533, graphical user interface 556, and communication circuits 570 for transmitting 572 and receiving 574 network signals, for example to a computing system like that illustrated in FIG. 3. Cart 555A may include additional functionality for ease or efficiency of the operator, but these components are optional and may not be present in some cart 555A implementations.

EID antenna 504A is an antenna operable to communicate using EID communications at distances equal to or greater than similar handheld devices. EID antenna 504A is configured to transmit EID communication signals 510, and receive EID tag information 512 transmitted by EIDs, e.g., RFID tags. EID antenna 504A may be 28.25" long, 12.5" high, 1.5" thick, and operable to communicate with EID tags at distances of greater than five feet. ED antenna 504A may be mounted to the cart 555A using appropriate technique including bolting to or embedding in cart 555A. More than one antenna, e.g., 504A, may be mounted to cart 555A, and connected to EID reader 502. Antenna(s), e.g., 504A may be omni-directional, or may be a directional antenna oriented in a particular direction.

FIG. 5B is a top view of a mobile EID reader having an antenna, in accordance with one or more embodiments of the present disclosure. Cart 555B has a first antenna 504B attached, and directed towards the front of cart 555B, e.g., in the direction of cart movement. One skilled in the art will appreciate that the direction of EID signals to/from antenna 504B may propagate not only directly in front of cart 555B, but also expand towards the sides of cart 555B depending on the directionality characteristics of antenna 504B.

FIG. 5C is a top view of a mobile EID reader having a single side-aimed EID antenna, in accordance with one or more embodiments of the present disclosure. Cart 555C has a first antenna 504C attached, and directed towards one side of cart 555B, e.g., in a direction at some angle to the direction of cart movement.

FIG. 5D is a top view of a mobile EID reader having dual side-aimed EID antennas, in accordance with one or more embodiments of the present disclosure. Cart 555D has a first antenna 504D1 attached, and directed towards one side of cart 555D, and a second antenna 504D2 attached, and directed towards one side of cart 555D. In this configuration, cart 555D may traverse a space between EID tagged items, and interrogate items on either side of the cart path. This placement allows the two antennas 125 to be oriented in opposite directions, thereby possibly allowing cart 110 to more efficiently collect tag information at greater distances.

Referring again to FIG. 5A, cart 555A uses at least one EID tag reader 502 for monitoring, querying, or otherwise processing data from EID antenna 504A. EID tag reader 502 is a device, such as a transceiver, operable to communicate with EID tags through one or more BID antennas, e.g., 504A. EID tag reader 502 may also be compatible to communicate, via wireless or hardwire signals, with other computers such as onboard computing device 533 and/or a remote server through wireless communication circuits 570.

In certain embodiments, EID tag reader 502 operates at a frequency compatible with BID tags, and communication circuits that operate at frequencies compatible for wireless network communications with the remote server, e.g., inventory tracking server, as may be known in the art. EID tag reader 504A, and/or communication circuits 570, may also include an encoder/decoder or other secured communication device.

Onboard computing device 533 comprises a local processing device (such as a laptop, personal data assistant (PDA), or other) operable to manage, massage, filter, or otherwise process EID tag information. Onboard computing device 533 may be mounted on cart 555A and communicably coupled with other components mounted on cart 555A using appropriate techniques. For example, onboard computing device 533 may be a laptop that rests on top of cart 555A, a PDA carried by the operator of cart 555A, or a processing device embedded within cart 555A.

In some embodiments, onboard computing device 533 may be wirelessly connected to other computers for subsequent processing or viewing of tag information. Moreover, onboard computing device 533 may also execute appropriate off-the-shelf, customized, or proprietary applications. For example, onboard computing device 533 may include a processor and memory configured to execute software and/or firmware operable to perform EID or other processing.

GUI 556 comprises a graphical user interface operable to allow the operator or other user of cart 555A to interface with onboard computing device 533 to view information associated with the one or more EID tagged items. Generally, GUI 556 provides the user of cart 555A with an efficient and user-friendly presentation of data, namely information from EID tags. GUI 556 may comprise a plurality of frames or views having interactive fields, pull-down lists, and buttons operated by the user. In one embodiment, GUI 556 communicates one or more web pages presenting information for at least a portion of the queried ED tags. GUI 556 may also present summarized or filtered information, as processed by onboard computing device 533.

EID reader 502 senses article identification indicia on the item or object, such as RFID tags, bar codes, etc., as the mobile reader cart moves around an environment in which the object is situated. Articles are detected by a reader, and associated with particular groups by the computing system updating a database, as the mobile reader cart is moved (or moves) throughout environment surveying the area(s) containing the various groups of articles, e.g., garments. The computer system associates the sensed identification indicia of an article, as determined by the reader device, with a group of articles in the environment based on either all sensed items belong to a group (as might be manually entered), or by the sensing of a group identifier (such as an area or group EID tag, barcode, etc.) in the environment, which may also be sensed by the reader device as an object identification indicia.

Figure 6:
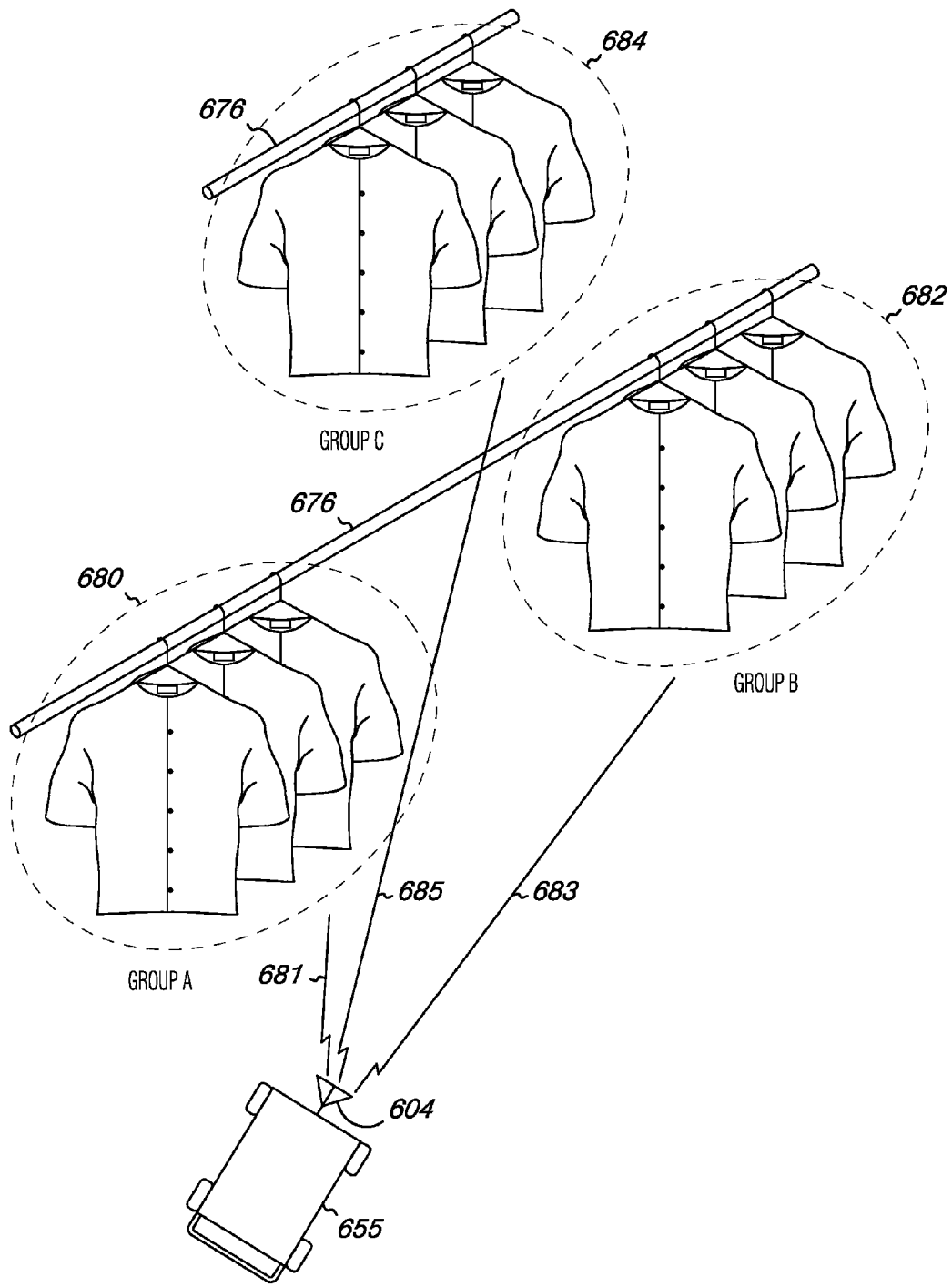
FIG. 6 is an illustration of an EID reader in operation, in accordance with one or more embodiments of the present disclosure.

FIG. 6 is an illustration of an EID reader cart in operation, in accordance with one or more embodiments of the present disclosure. There can be difficulty in discriminating between EID tags associated with groups of items when the groups are in close proximity to one another, which can preclude the use of EID tags in closely-spaced sorting arrangements, such as continuous conveyors or laundry facility staging areas.

FIG. 6 shows groups of articles, e.g., groups of garments 680, 682 and 684, suspended from an article holding device, e.g., 676, by a hanger for example. Article holding device, e.g., 676, may be fixed, such as a garment bar, or may be movable, such as a mobile garment rack or motorized conveyor. Garments may hang on the article holding device, e.g., 676, as shown, or may be otherwise contained in or on the article holding device, such as in a bin or basket, etc.

A reader cart 655, having an antenna 604, may be positioned in the vicinity of the groups of garments. Although illustrated in FIG. 6 as a mobile reader cart, the reader may be stationary, e.g., with the articles passing thereby, or may be a handheld reader, or other fix or mobile reader configuration.

The articles may be arranged in groups for a number of purposes, for example, those articles belonging to one individual or organization may be grouped together, or articles of a similar type may be grouped together prior to receiving similar processing, e.g., cleaning and/or sanitizing, etc., or articles destined for a common delivery location may be grouped together prior to shipping. The groups may contain sub-groups of similar, or different, articles, e.g., pants and shirts, or a delivery group may contain articles to be ultimately distributed to more than one individual at a given location, etc.

Articles, and groups of articles, move relative to the reader cart 655 and antenna 604, or the reader cart 655 may move relative to the articles. For example, a conveyor may move groups of garments in a path which takes a tagged garment of a group past a reader. Or a mobile reader, e.g., cart 655, may pass stationary groups of tagged articles. Or both the articles and reader may be in motion relative to one another.

As illustrated in FIG. 6, antenna 604 may excite, and thus receive signals from articles within any or all of groups A, B, and/or C. Thus if cart 655 is intending to survey a single group of articles, e.g., Group A, so as to ascertain which tagged articles are included in the group, errors may be introduced due to EID tagged items in the vicinity responding which are not part of the group intended to be inventoried. This is particularly problematic when EID tags are read at farther distances, or in areas having a plurality of groups of articles in close proximity.

Figure 7:
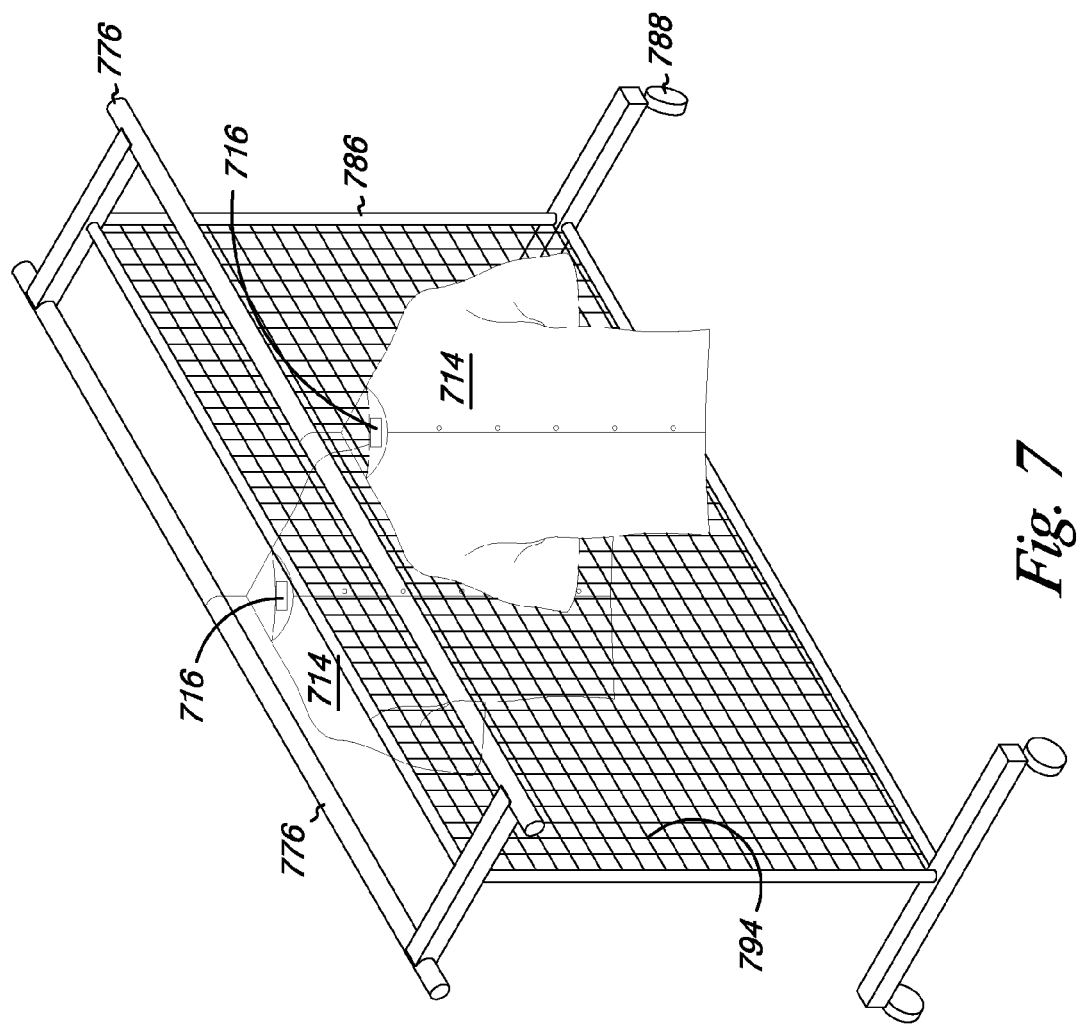
FIG. 7 is a perspective view of movable Faraday screening panel, in accordance with one or more embodiments of the present disclosure.

FIG. 7 is a perspective view of a movable Faraday screening panel, in accordance with one or more embodiments of the present disclosure. The movable Faraday screening, e.g., Faraday screening panels, include Faraday screen material 794 mounted in a frame, e.g., 786. The frame 786 may be mounted on wheels, e.g., 788, rollers, casters, or other mechanism to facilitate mobility of the frame 786.

According to one or more embodiments, one or more article holding devices 776, such as a bar, rack, or shelving and the like, may be mounted to the frame 786. Articles, such as garments 714 may be held in, or suspended from, the article holding devices 776. FIG. 7 shows two clothing bars 776 suspended from frame 786, one bar 776 on each side of the Faraday screen material, in the manner of a dual clothing rack. The frame 786, and Faraday screen material 794, may extend vertically up above the height of the bars 776, and extended to the sides beyond the ends of the bars 776, such that articles hanging on one side of the Faraday screen material 794 are adequately shielded from EM signals originating on the opposite side of the Faraday screen material 794.

Faraday screening is generally a metallic screen that mitigates, or prevents, the passage of an electromagnetic (EM) field below a certain wavelength therethrough, e.g., a radio frequency (RF) shield. According to one or more embodiments of the present invention, Faraday screening may pass visible light, and block or attenuate radio signals of certain frequencies, e.g., RFID communication signals. Thus, objects such as EID tagged articles, may be visible through Faraday screening, while RFID communications through Faraday screening are prevented or mitigated. A similar application on microwave oven doors permits a user to see food inside by allowing light waves to pass, while containing the microwaves generated inside.

Ideal Faraday screening consists of an unbroken, perfectly conducting barrier. Practical applications of Faraday screening can approach ideal performance by being constructed of fine-mesh screening made of conducting materials, such as metals, e.g., copper, and alloys, instead of a solid conductor. Faraday screening is used to block EM radiation in a particular direction. A Faraday cage may be constructed by screening all sides, e.g., a room, vehicle, or container. As one skilled in the art will appreciate, Faraday screening having holes therethrough that are less than about a wavelength across will not materially affect shielding performance. Therefore, the cutoff frequency of Faraday screening is proportional to the mesh size, thickness, and material used to fabricate the Faraday screening. However, as a practical matter, holes, or surface variations, in the Faraday screening should usually be less than a fraction of a wavelength of the desired frequency which is to me blocked or attenuated.

For best performance, the Faraday screening, e.g., Faraday screen material 794 and/or frame 786, may be connected to a circuit or earth ground. Faraday screening in accordance with the present invention may include one or more layers of fine metal mesh or perforated sheet metal. Solid materials may be used for Faraday screening where visual properties therethrough are not required.

Figure 8:
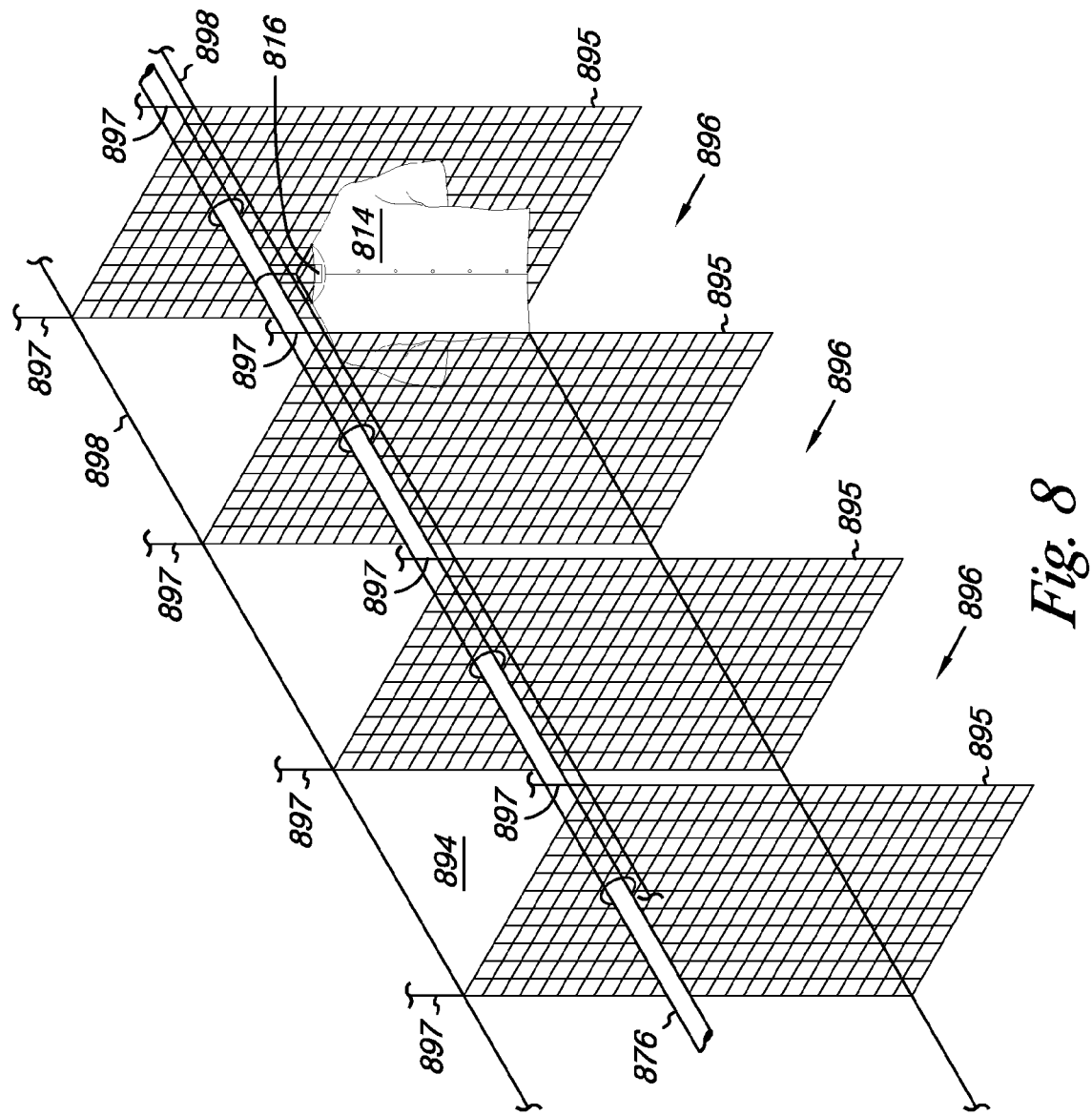
FIG. 8 is a perspective view of an arrangement of Faraday screening, in accordance with one or more embodiments of the present disclosure.

FIG. 8 is a perspective view of an arrangement of Faraday screening, in accordance with one or more embodiments of the present disclosure. An article identification system may utilize Faraday screens, e.g., 895 to create areas, e.g., 896 within which articles, e.g., 814, having EIDs 816, e.g., EID tags, may be stored. The areas may be configured to have a bar 897, or conveyor mechanism, from which articles may be hung on hangers. The wall 894 may also be configured as Faraday screening, either being constructed of appropriate conductive mesh materials, or being of a thickness such that EID communication signals cannot pass therethrough.

The Faraday screens 895 may be fixed or movable. For example, the Faraday screens may be hung from fixed or movable ceiling supports, e.g., 897, or from the bar 897, or other horizontal supports 898. Faraday screening may be placed above area 896 (not shown) where vertical shielding (e.g., oriented horizontally) may be needed, or desired, between vertical areas. In a conveyor arrangement, the Faraday screening may be to the conveyor mechanism such that it moves along with the tagged articles.

Figure 9:
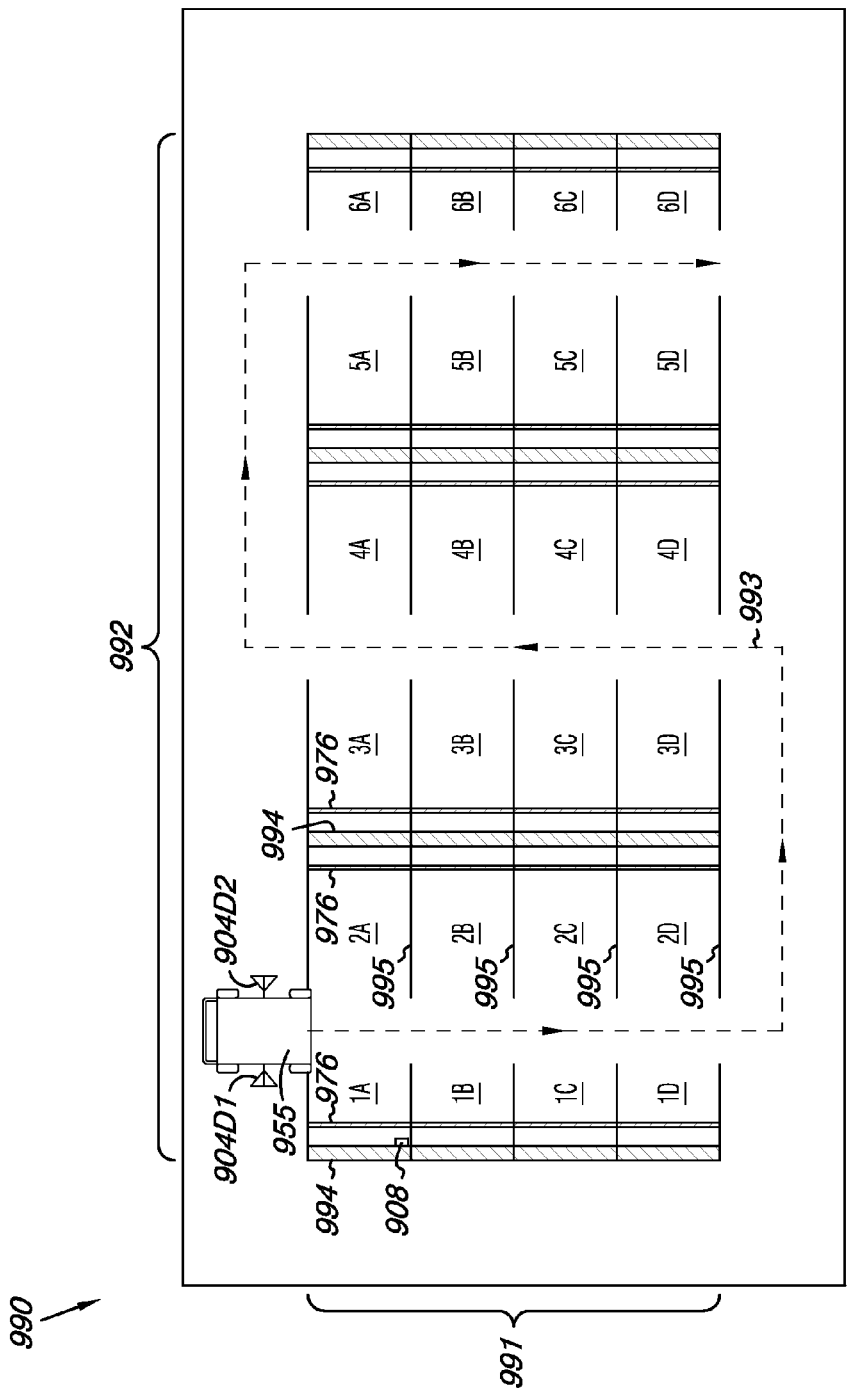
FIG. 9 is an illustration of an array of Faraday-screened areas, in accordance with one or more embodiments of the present disclosure.

FIG. 9 is an illustration of an array of Faraday-screened areas, in accordance with one or more embodiments of the present disclosure. The Faraday-screened areas may be fabricated with stationary Faraday screening, with movable Faraday screening, e.g., as illustrated in FIGS. 7 and 8, or with a combination thereof. An array of shielded areas, e.g., 1A, 2A, 1B, etc., may, for example, define areas corresponding to different stages in a laundering process.

Shielded areas are formed using walls 994 and Faraday screening 995 panels, as illustrated further in FIG. 8. The array of shielded areas are arranged in one or more embodiments, to include a number of rows 991 and columns 992, and having a pathway 993 through which a mobile reader may traverse the area to interrogate one or more of the shielded areas.

Areas may be configured to have a clothing rack or bar 976 by which garments may be hung (as also shown in FIG. 9). The shielded areas, e.g., 1A, 2A, 1B, etc., may define areas corresponding to different stages in a laundering process, such as receiving, washing, drying, sanitizing, storage, shipping, etc. Or the shielded areas may correspond to a type of article, a certain article characteristic (such as color, size, etc.), a particular customer, a particular truck, or other appropriate category into which the articles may be separated.

While FIG. 9 illustrates an array of shielded areas, e.g., 1A, 2A, 1B, etc., in a row and column orientation, embodiments of the invention are not so limited. The shielded areas may be of a number of dimensions, and/or geometric footprint. According to one or more embodiments, the shielded areas are formed by appropriately positioning movable Faraday screening panels, such as those illustrated in FIG. 7, e.g., the walls 994 correspond to frame 786, and movable Faraday screening panels (without attached cloth bars, e.g., 776 in FIG. 7) are used as the Faraday screening panels 995.

According to one or more embodiments, the walls 994 may be fixed in the space, with the Faraday screening 995 panels being re-positionable along the walls, so that areas of different dimensions corresponding to different quantities of articles stored within, or corresponding to different shapes and/or sizes of articles staged therein. According to one or more embodiments of the present invention, Faraday screening 995 panels are independently movable such that shielded areas may be constructed of different geographic footprint, which may or may not involve a wall, and may be of varying footprint shape and/or dimensions.

According to one or more embodiments of the present disclosure, a group of articles is stored within an area formed by the Faraday screening. Faraday screening may be re-configured as the articles within a particular area changes, for example, Faraday screening may be added to increase a shielded area size as additional space is needed within a particular area for storage of additional articles therein. Shielded areas defining groups of articles may correspond to trucks by which the articles stored within are to be shipped, or according to the customer to which the articles within are to be shipped, or according to the type, color, size or other characteristic of the articles stored within.

According to one or more embodiments of the present invention, a mobile cart, e.g., 955, having an EID reader and one or more antennas, e.g., 904D1 and 904D2, mounted thereon, may be programmed to follow a path corresponding to the changing configuration of Faraday screening defining various shielded areas, e.g., need not follow a predetermined path corresponding to an array of shielded areas arranged in rows and columns.

FIG. 9 illustrates a system 990 for managing at least one item using a portable EID antenna, e.g., 904D1 and 904D2 mounted on mobile reader cart 955. System 990 may comprise all or a portion of an appropriate location including, for example, a commercial laundry facility, factory, or warehouse. The location may include tens, hundreds, thousands, or even millions of shielded areas, e.g., 1A, 2A, 1B, etc., arranged in an array having rows 991 and columns 992 for example, or other configuration. The arrangement may also be three-dimensional, with a vertical space delimited by Faraday screening oriented parallel to the floor and/or ceiling. Each shielded area may have an EID tag associated with the area itself, e.g., 908 (in addition to the EID tags associated with the articles therein).

Thus articles stored in the shielded areas may be located across tens of thousands of square feet. The shielded areas may be laundry staging areas, for example, to place articles having certain common characteristics together, such those articles to be delivered to a particular location or customer, or garments of a same type or color, etc. Accordingly, these large locations may be difficult to manually inventory or locate individual items. System 990 may be of a size or configuration that includes one or more EID tagged items and accommodates (or is operable to be scanned by) cart 955. For example, illustrated system 990 includes cart 955, coupled with one or more EID antennas, e.g., 904D1 and 904D2, an EID tag reader and an onboard power source (e.g., the cart configuration shown in FIG. 5A). Cart 955 may be operable to communicate with EID tagged items in the shielded areas, e.g., 1A, 2A, 1B, etc.

The method of the present invention is described with respect to system 990 and, in particular, to a warehouse including a local or remote inventory tracking server. However, another suitable system or portion of a system may use appropriate embodiments of the method to retrieve and process EID information from articles stored with the shielded areas, e.g., 1A, 2A, 1B, etc., and to manage a plurality of EID tagged articles. Generally, an operator pushes or directs cart 955 along path 993 routed so as to pass before Faraday cages in some order, in a manner such that EID tags on articles contained in the shielded areas may be queried from a distance outside each shielded area.

As one skilled in the art will appreciate, using shielded areas having an opening on one end towards the path 993, allows cart 955 to pass directly in front of a shielded area so as to direct EID communication signals towards a particular shielded area, and selectively read the EIDs located with the particular shielded area. In this manner, reading EIDs on articles belonging to other groups, e.g., in other shielded areas, will be mitigated.

Where each Faraday cage is equipped with an EID tag, e.g., 908, the EID tags of articles within the Faraday cage can be associated together with the Faraday cage. The principle advantage to storing articles in the Faraday cages is to block EID signals to/from tags on articles in other Faraday cages, assuming articles within one Faraday cage comprise one group of articles.

Cart 955 is enabled, powered on, or otherwise initialized, to power-up the onboard power source, EID tag reader, antenna, and/or other components of cart 955. Cart 955 may be relocated to a first location, for example at the beginning of path 993 between Faraday cages 1A and 2A. Cart 955 may confirm its location by interrogating the EID tags of the nearby Faraday cages.

When cart 955 is actually relocated, this movement may be through a technique appropriate for cart 955. For example, an operator may hand-push cart 955 to a desired location along path 993. In another example, the operator may select a predetermined location using an onboard computing device and display, e.g., 533 and 556 illustrated in FIG. 5A. In yet another example, cart 955 may automatically relocate using a predetermined route loaded in the onboard computer, or may dynamically determine a route based on shelving, sensors, or other obstacles and input.

Once cart 955 is present at the desired location in front of one or more Faraday cage, e.g., 1A, then its onboard EID tag reader queries a first EID tag within range of EID antenna, e.g. 904D1 and/or 904D2, on an article located among a group of articles with a Faraday cage. Where more than one antenna is utilized, cart 955 may power one antenna at a time, or reader may segregate EID signals received through one antenna, from EID signals received through other antenna(s).

This query may comprise a request, a retrieval, or other communication that results in tag information being received at the onboard EID tag reader. Received tag information may be communicated to the onboard computer, and/or a remote computer system via the wireless network connections. Tag information may be communicated to software for a suitable local or remote processing. The collected, and/or processed information may also be stored in a local database, or other memory or data module.

If cart 955 is wireless enabled, then cart 955 may communicate EID tag information to a remote server via wireless network connections. EID tag reader, or the operator, determines if there are more desired EID tags within the selected Faraday cage area, within range of the EID antenna(s), e.g., 904D1 and 904D2. The cart 955 may query additional tags within range and within the selected Faraday cage. Once there are no more tags to query with the group of articles in a selected Faraday cage, then cart 955 processes articles in another Faraday cage, or relocates to a next location along path 993, and continues processing of additional Faraday cages.

System 990 may be or include a low frequency system (125-134 kHz), high frequency system (13-14 MHz), a UHF system (850-950 MHz), a microwave system (2.4 GHz), another suitable frequency, or combination thereof compatible with a particular cart 955 and operable to transmit EID information. This information may be stored in a local (onboard cart 955) tag memory or other coupled memory. In other words, an interrogated EID tag within a Faraday cage, on an article belong to a group of articles, may automatically supply users of system 990 with electronic information not only about individual tagged items, but also about item(s) comprising the group of items within the Faraday cage without interference from tagged items belonging to other groups located in other Faraday caged areas.

This information may include a serial number, an ED identifier, an inventory number, a SKU, or other identifying or inventory characteristics. Once sufficiently loaded with certain information, then an EID tag is operable to communicate this data to the EID tag reader on cart 955 through an EID antenna mounted to cart 955, e.g., 904D1 and 904D2 in response to or based on queries from the reader on cart 955. For example, in one burst or over a (relative) time period, an EID tag communicates this data to the onboard EID tag reader through the portable EID antenna, for possible relaying or downloading, to an article identification system server. Using an appropriate technique, the onboard EID tag reader directly or indirectly presents or otherwise communicates this information to the operator, or a local program module, for viewing, processing, or communication to another computing system. For example, the onboard EID tag reader may present the information through the onboard display, create a report or other output through the onboard computer, or communicate this information to an inventory tracking server, e.g., 334 as shown in FIG. 3, for subsequent processing and presentment.

Figure 10:
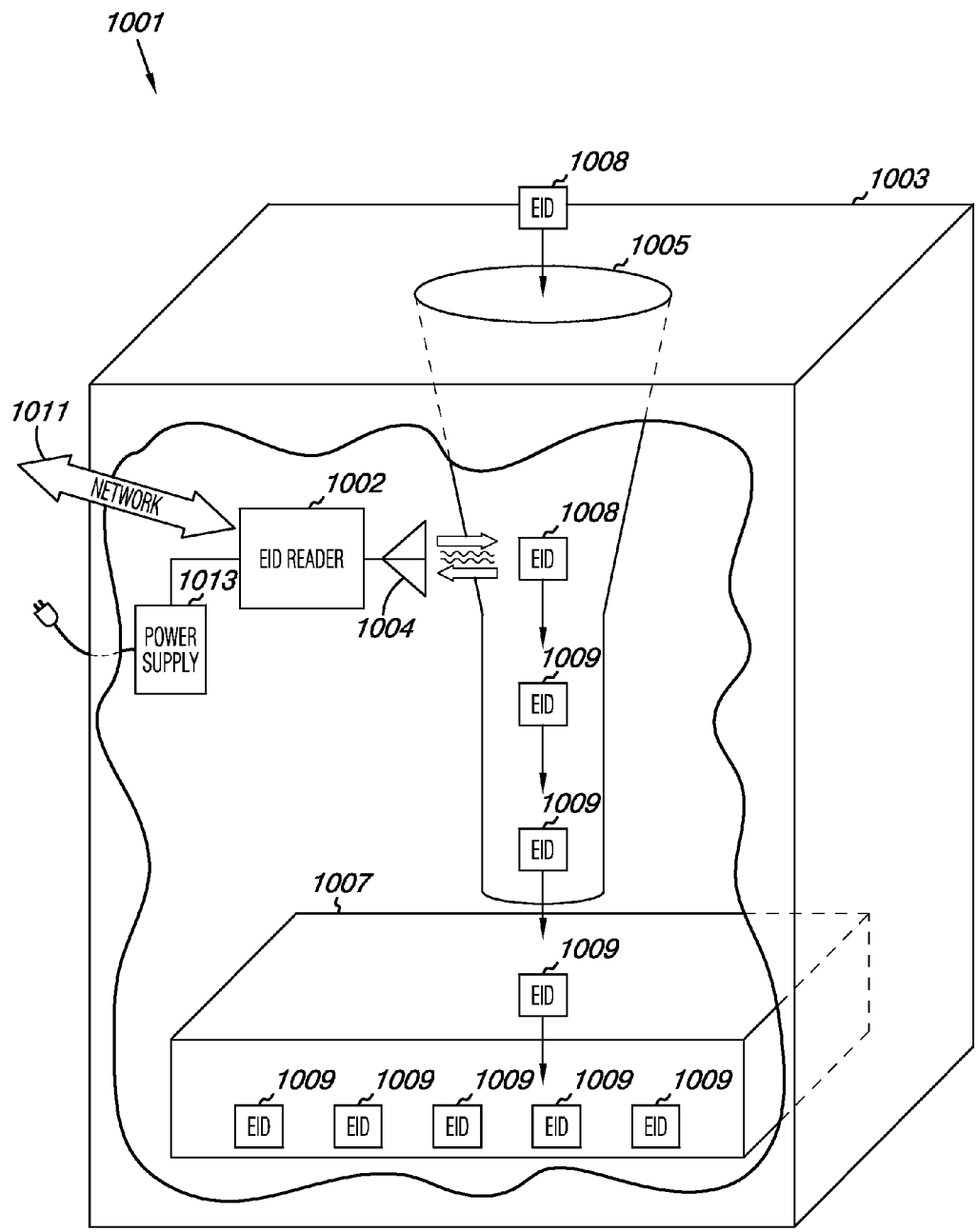
FIG. 10 is a cut-away view of a recycle reader station, in accordance with one or more embodiments of the present disclosure.

FIG. 10 is a cut-away view of a recycle reader station, in accordance with one or more embodiments of the present disclosure. According to one or more embodiments, the recycle reader station may be communicatively coupled to an article identification system (such as that illustrated in FIG. 3). A recycle reader station 1001 is optionally fabricated from Faraday screening material, such as a metal Faraday cage 1003. Faraday cage 1003 has an opening 1005 through which one or more EIDs, e.g., RFID tags, 1008 may be deposited. For example, opening 1005 may be a drop slot in one or more embodiments. In one or more embodiment, the opening leads to a conical funnel-shaped cavity formed of plastic or other non-Faraday screening material; however, the cavity is not limited in shape or dimensions, and may be square or rectangular for example. The cavity is arranged to direct EIDs by gravity towards a container, e.g., drawer, 1007 at the bottom of the recycle reader station 1001.

Container 1007 may be a pull-out drawer, or otherwise fashioned to collect EIDs dropped into opening 1005 and through the conical funnel-shaped cavity by gravity, for example. As EIDs 1008 fall through the cavity, they pass by an antenna 1004 coupled to an EID reader 1002 and are read (and optionally programmed, unprogrammed, erased, and/or initialized) thereby.

The EID reader 1002 of the EID recycle station is communicatively coupled to an inventory tracking server, e.g., inventory tracking server 334 in FIG. 3, by network interconnection 1011 for example. The EID recycle station 1001 is configured to: read the EID deposited therein as it falls by gravity; retrieve the identifying data; and communicate to the inventory-tracking database that the identifying data is to be dis-associated from the article to which it may have been previously associated. After an EID 1008 is dis-associated, it may be again considered as an available EID 1009, e.g., available for being associated with another article.

According to one or more embodiments, the reader transmits the tag's identity information to an EID manager application, e.g., running on an article identification system server, by wireless or hard wired connections, e.g., 1011. The recycle reader station is thus used to "issue" unassociated garment EID tags as they may be removed from garments at one or more stages of processing, e.g., commercial laundering. Thus, an EID may be physically separated from the garment or article is was previously associated with, and tag and article inventory can be appropriately adjusted and updated to un-associate the EID from the article in a database. The erased tag may them be reassigned to another article, e.g., garment.

Conclusion

The present disclosure includes methods and systems for identifying articles. One method embodiment includes positioning a number of movable Faraday screens in particular locations relative to a number of different stages in a laundering process, and moving a mobile electronic identification device (EID) reader past the locations.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for identifying articles, comprising:
positioning a plurality of movable Faraday screens in particular separate locations relative to a number of different stages in a laundering process; and
moving a mobile electronic identification device (EID) reader past the separate locations while the plurality of Faraday screens are in stationary positions at the separate locations.

2. The method of claim 1, including transporting articles having EIDs to screened areas defined by the movable Faraday screens in the stationary positions.

3. The method of claim 2, including dynamically re-positioning the Faraday screens to adjust relative sizes of areas to be screened based on article quantity changes within the screened areas.

4. The method of claim 1, wherein the stages are selected from a group comprising: receiving, washing, drying, sanitizing, storage, and shipping.

5. The method of claim 1, wherein the mobile EID reader includes:
a processor;
a memory; and
computer executable instructions stored in the memory and executed by the processor to:
obtain an EID identifier, wherein the EID identifier is associated with an article in the laundering process.

6. The method of claim 5, wherein computer executable instructions are further executed by the processor to:
obtain additional EID data including:
characteristics of the article; and
a set of laundering information for the article.

7. A method for identifying articles, comprising:
selectively reading, with an electronic identification device (EID) reader having a first antenna, an EID associated with each article in a first group; and
shielding, with a plurality of Faraday screening in separate stationary positions, a communication path from the first antenna to EIDs associated with articles not in the first group; and
determining a path of a mobile cart that carries the EID reader based on positioning of the Faraday screening in the stationary positions.

8. The method of claim 7, including moving the EID reader to establish a communication path between the first antenna and the first group.

9. The method of claim 7, including:
positioning the Faraday screening to define a first area, the first group being in the first area; and
re-positioning the Faraday screening to modify the first area.

10. The method of claim 9, including:
associating an EID with the first area; and
associating the EID of each article in the first group with the first area.

11. The method of claim 7, wherein the EID is a radio frequency identification (RFID) transceiver.

12. The method of claim 7, wherein the EID reader has a range, and the communication path is shielded to EIDs associated with articles not in the first group located within the range.

13. The method of claim 7, including:
selectively reading, with the EID reader having a second antenna, an EID associated with each article in a second group; and
shielding, with Faraday screening in the stationary position, a communication path from the second antenna to EIDs associated with articles not in the second group.

14. The method of claim 13, wherein the first antenna is arranged to not have a communication path to the second group, and the second antenna is arranged to not have a communication path to the first group.

15. The method of claim 13, wherein the EID reader, the first antenna, and the second antenna are mounted on a mobile cart, and the method includes positioning the mobile cart between the first and second groups.

16. The method of claim 13, including positioning the Faraday screening based on an available path for the mobile cart relative to a number of different stages in a laundering process.

17. A system for selectively discriminating a first group of electronic identification devices (EIDs) from a second group of EIDs during reading, comprising:

a mobile EID reader, having an antenna, configured to read the first group of EIDs; and a plurality of Faraday screening panels positioned in separate stationary positions according to a particular arrangement to shield transmission of communication signals between the second group of EIDs and the antenna during reading of the first group of EIDs based on an available path of the mobile EID reader in a laundry facility.

18. The system of claim 17, wherein the number of Faraday screening panels are further arranged to shield transmission of communication signals between the first group of EIDs and the antenna during interrogation of the second group of EIDs.

19. The system of claim 17, wherein the number of Faraday screening panels are arranged to confine transmission of communication signals from the antenna to a particular area of the laundry facility.

20. The system of claim 17, wherein the number of Faraday screening panels are movable.

21. The system of claim 17, wherein the number of Faraday screening panels are formed of conductive material arranged in a mesh that passes visible light and attenuates radio frequency identification (RFID) signals.

* * * * *